Nov. 10, 1970     F. W. KARASEK     3,538,744
CHROMATOGRAPHY APPARATUS
Filed Nov. 9, 1967     2 Sheets-Sheet 1
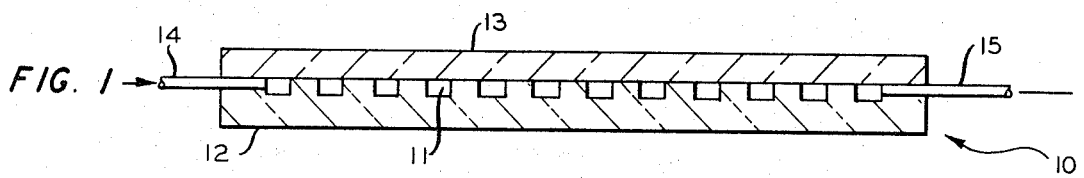
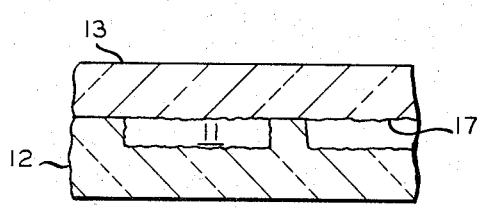
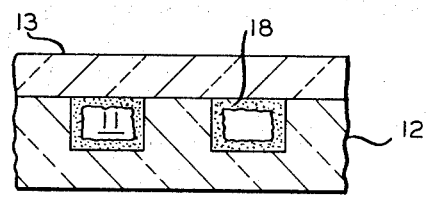
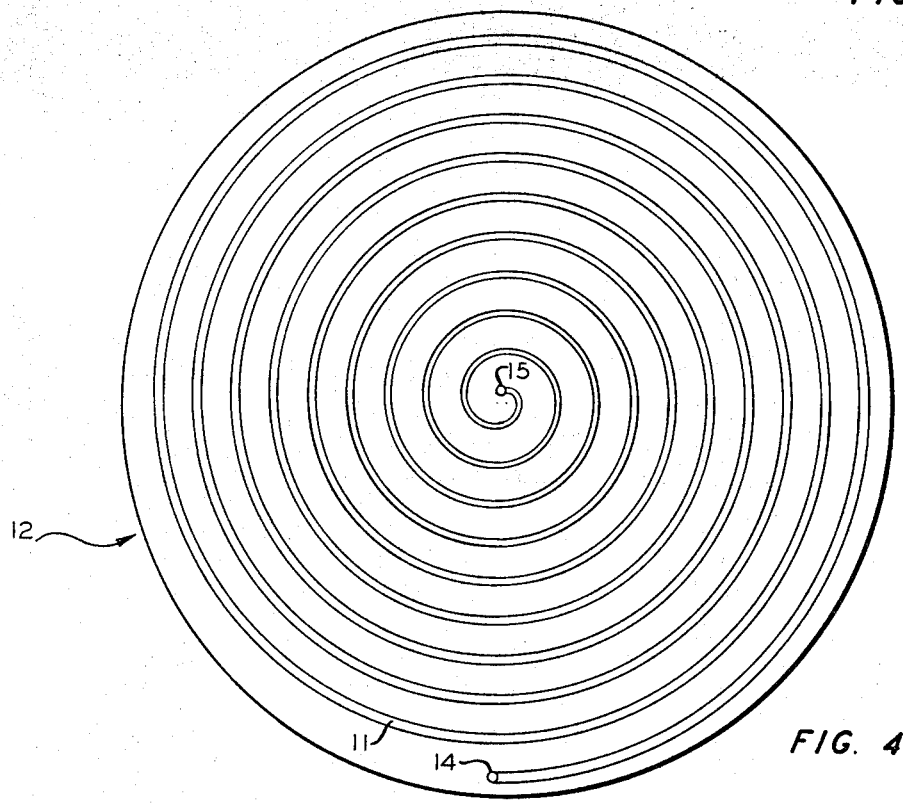
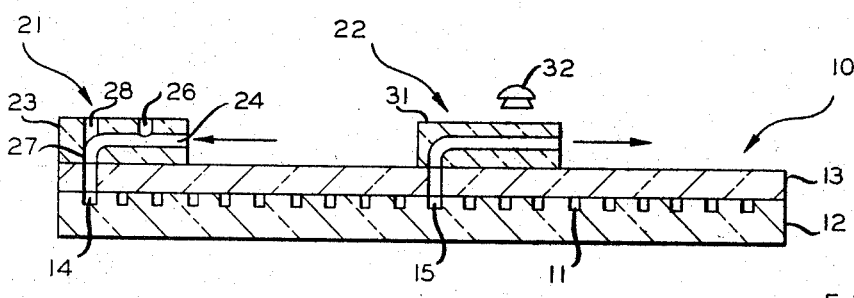
INVENTOR.
F. W. KARASEK
BY
Young & Quigg
ATTORNEYS

INVENTOR.
F. W. KARASEK

United States Patent Office 3,538,744
Patented Nov. 10, 1970

3,538,744
CHROMATOGRAPHY APPARATUS
Francis W. Karasek, Bartlesville, Okla., assignor to Phillips Petroleum Company, a corporation of Delaware
Filed Nov. 9, 1967, Ser. No. 681,822
Int. Cl. G01n 31/08
U.S. Cl. 73—23.1         4 Claims

ABSTRACT OF THE DISCLOSURE

A chromatographic apparatus comprising a microchannel etched in the surface of a glass or metallic plate to which a top plate is secured in fluid-tight relationship to form a column. The internal dimensions and length of the fluid flow passage are such that the components from a fluid mixture moving through the column are detained for characteristically different periods of time. The plate can include a sample switch, detector, and like components in the form of fluidic or solid state devices to miniaturize an entire chromatography system.

---

This invention relates to gas chromatography. In one aspect the invention relates to a minaturized chromatographic column. In another aspect the invention relates to a chromatographic system utilizing a miniaturized component.

Chromatography is a technique of analysis whereby the components of a fluid mixture are first separated from one another by some type of selective sorption means and then detected and analyzed. The conventional method of separating a fluid mixture is to pass the mixture through a column containing a fixed phase partitioning or absorptive agent for which the components of the mixture have different affinities or sorption equilibrium. In addition to the separation column, the conventional chromatography system includes means for injecting the sample, means for supplying an inert carrier fluid to drive the sample through the column, a detector to sense the concentration of individual components as they are eluted from the column, and a programmer to initiate sample injection at desired time intervals. This combination of elements often results in a heavy, bulky apparatus which is unsuitable for certain applications.

One known separation column is the tubular capillary column which has an internal coating of liquid organic partitioning agent. Because of the small capillary cross section, pneumatic resistance is high and volumetric flows are necessarily low. Sample size and injection and detector volumes are critical. The loading of capillary columns is critical with respect to partitioning agent coating thickness and uniformity. Uniformity of the layer is important. If globules of liquid are present, or uneven layers present, the efficiency of the column will be drastically reduced. The conventional columns using metal and glass tubes present surfaces where it is difficult to deposit a smooth, uniform layer. An excess of partitioning agent seriously affects capillary column efficiency because of increased time of sample diffusion which leads to unequilibrium in the mobile sample phase and the stationary partitioning agent. If an insufficient amount of the stationary phase is deposited separation efficiency is impaired and repeated passage of samples will tend to dissolve the coating and drive it from the column.

Accordingly it is an object of the invention to provide an improved chromatographic column.

Another object of the invention is to provide a light weight compact chromatographic system.

Another object of the invention is to provide an uncoated chromatographic column which does not rely upon any partitioning agent to separate components from a gaseous mixture.

These and other objects of the invention will be apparent to one skilled in the art upon consideration of the following disclosure, drawings, and appended claims.

FIG. 1 is a transverse cross sectional view of the miniaturized column of the invention.

FIG. 2 is an enlarged cross sectional view of one embodiment of the column of the invention.

FIG. 3 is an enlarged cross sectional view of another embodiment of the column of the invention.

FIG. 4 is a top plan view of an embodiment of the invention.

FIG. 5 is a cross sectional view of the column shown in FIG. 3 and associated components.

Figure 6:
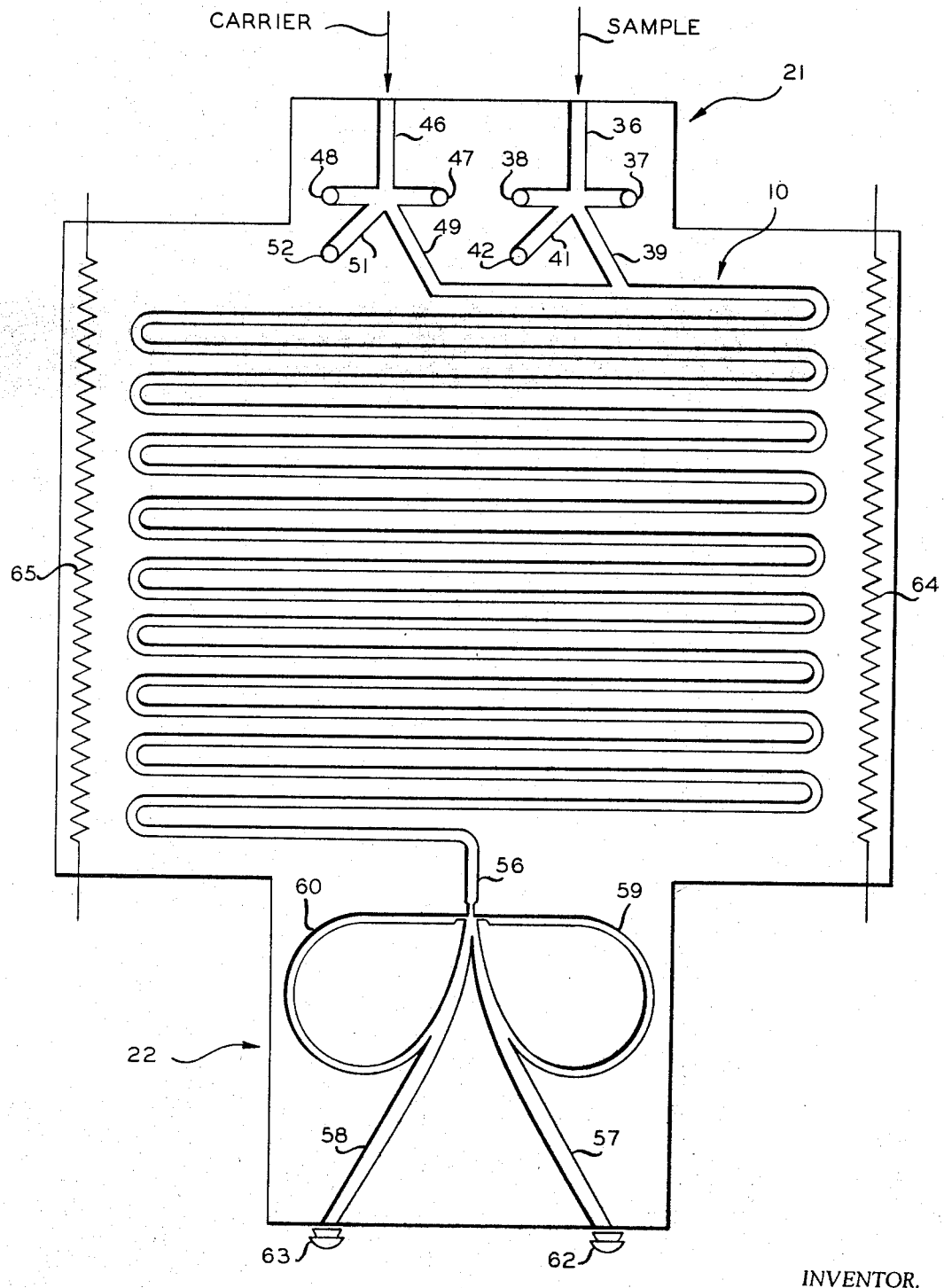
FIG. 6 is a top plan view showing a plate containing sample injection means, a column, and detector means.

According to the invention, there is provided a chromatographic column for the separation of components of fluid mixtures comprising a first plate having a face containing a microchannel in a circuitous path, a second plate secured to the face of the first plate in fluid-tight relationship to form a single unobstructed flow passage, having a feed end and a discharge end, an inlet communicating with the feed end, an outlet communicating with the discharge end. The interior dimensions of the passage are in such relationship to the length of the passage that the components of a fluid mixture moving through the passage are detained for characteristically different periods of time and emerge separately from the column outlet. By following a circuitous path, which in the case of a rectangular plate can be sinuous, or in the case of a round plate can be spiral, a passage of relatively great length can be contained in plates of relatively small area.

The plates can be of any suitable material which is compatible with the components of the carrier gas and sample to be separated. Such suitable materials include glass, ceramics, and metals. In one embodiment of the invention a first reactant is incorporated into the material from which the plates are fabricated and a second reactant which will selectively remove the first reactant from the material is passed through the passage. For example, hydrochloric acid can be passed through a passageway formed from a channel machined in an iron-containing aluminum plate. This creates an open lacy or dendriform type of surface in the interior of the passage to increase the surface area of the column.

All fluids, both gases and liquids, have some sorptive affinity for solids and by proportioning the length to the internal dimensions of a passage in a certain solid material separation of a gaseous mixture can be effected. Of course, the efficiency of a column can be changed or the length decreased by coating the passage with a partitioning agent.

Further in accordance with the invention, there is provided a chromatographic system wherein the above-described column is utilized in combination with fluidic devices acting as sample injection valves to inject a predetermined volume of sample mixture into the column and as a detector to sense the concentration of the separated components as they are eluted from the column. In one embodiment of the invention all of these components are etched and interconnected on a single ceramic plate to which a top plate is secured, thus providing a sturdy miniaturized chromatographic system which has a high efficiency.

Referring now to the drawings, wherein like reference numerals are used to denote like elements in the different figures, the invention will be described in detail. In FIG. 1 there is shown a cross section of a chromatographic column, designated generally as 10. Column 10 is formed by a microchannel or passage 11 which follows a circuitous path across a face of bottom plate 12. To maintain the desired compactness of column 10, microchannel 11 is cut to a depth of about 0.100 inch or less. The channel can be formed in plate 12 by etching, photoetching, engraving, or any other suitable method. A top plate 13 is secured to plate 12 in fluidtight relationship by the use of adhesives, machine screws, clamps, fusing the plates together, or other suitable means. The covered channel forms a single unobstructed flow passage which is illustrated in plan view in FIGS. 4 and 6. Inlet means 14, communicating with one end of the passage, and outlet means 15 at the other end of the passage are provided. One preferred method of fabricating the column is to photoetch the channel in a glass-ceramic plate and then fuse a top plate of the same material to the bottom plate to obtain a high strength durable ceramic having a passage forming the column of the invention.

The embodiment illustrated in FIG. 1 is not coated with a partitioning agent. The internal dimensions (depth and width) of the channel 11 are proportioned to the length of the passage so that the components of the particular fluid mixture flowing through the passage are detained by sorption on the materials from which the plates are made for characteristically different time periods before they are eluted through outlet 15. Thus, the particular fluid mixture to be analyzed, and the material from which the plates are fabricated and treatment of the passages, such as etching, are design factors which affect the internal dimensions and length of the passages.

In FIG. 2, an enlarged cross section, the passage is shown to have an interior surface 17 which is pitted, lacy, and dendriform in structure. The dendriform surface 17 of column 10 offers an increased surface area from which the components of the gas mixture can be adsorbed. As illustrated, the channel width may be greater than the channel depth to give greater surface area. One method of obtaining the interior dendriform surface is to incorporate a reactive compound or element in the material from which the plates are made and flow a second reactive compound through the passage to react out and remove the incorporated component. For example, by incorporating boron in glass and etching with hydrochloric acid, the removal of boron from the crystalline lattice results in a greatly increased surface area.

FIG. 3 illustrates the internal surface of the column of the invention as being coated with a partitioning agent 18. The partitioning agent may be a liquid, such as polyethylene glycol, or appropriate solid, such as silica gel. A partitioning agent, as used in a chromatographic process, possesses a quality of having a different physical affinity for each of the components to be separated from the mixture. The partitioning agent does not enter into chemical reactions with any of the components contained in the sample nor does it otherwise cause changes in the physical and chemical properties of the sample components. These same limitations, of course, apply to the material from which the channeled plates of the invention are fabricated A number of partitioning agents are currently in general use, and the selection of a particular agent depends largely upon the analysis to be made. In certain applications where the length of an uncoated column would be unduly great, for example 200 feet or more, and it is desired to fabricate a highly efficient compact column, the use of a partitioning agent allows the length to be minimized without a loss in column efficiency.

FIG. 4 is a plan view of a circular plate 12 having a channel 11 following a spiral path to form a column of relatively great length contained in a relatively small area.

FIG. 5 shows, in cross section, sample inlet means 21 and detector means 22 associated with a column 10, having a spiral path as illustrated in FIG. 4. In this embodiment the sample inlet means comprises a fluidic switching valve 23 having an inlet 24, control point port 26, sample injection port 27, and sample by-pass port 28. The detector means comprises a fluid oscillator 31 in combination with a microphone 32. A suitable fluid oscillator and microphone arrangement is described in U.S. Pat. No. 3,273,377, issued to K. M. Testerman et al. on Sept. 20, 1966. A sample fluid mixture is continuously passed through the fluidic valve 21 and by-pass outlet port 28. At predetermined time intervals the flow is switched and a standard volume of the sample is injected through port 27 into the column. Carrier fluid is injected through another fluidic valve (not shown) to drive the sample through column 10. The individual components are eluted at different time intervals and flow from outlet 15 through fluid oscillator 22. As will be herein described the frequency of oscillations set up in the fluidic device 22 are related to the molecular weight of the fluid flowing through the device. The oscillation frequency is received by the microphones and can be converted to the output beat frequency representative of the molecular weight of the gas.

In FIG. 6, the column 10, sample and carrier gas injection means 21, and detection means 22 are shown as being etched in a single plate. The fluidic sample valve comprises inlet 36, control ports 37 and 38, divergent passageways 39 and 41, and a by-pass outlet 42. The outlet ports are connected to a timing device or programmer (not shown) and supplied with pressure by sample or carrier gas. Pressure supplied to port 37 shunts sample flow through passageway 41 and by-pass outlet 42. For given time intervals and at predetermined periods, pressure is supplied to port 38 and sample's flow is diverted through passageway 39 into column 10.

Carrier fluid is injected through a second fluidic valve comprising inlet 46, control ports 47 and 48, passageways 49 and 51, and by-pass outlet 52. It is controlled by the programmer so that during the sample injection interval, carrier fluid pressure is supplied to port 47 and the carrier is diverted through by-pass outlet 52. Upon completion of the sampling interval, pressure is supplied to port 37 to divert sample flow to by-pass outlet 42 and simultaneously pressure is supplied to port 48 to again direct the flow of carrier gas into column 10. As the carrier gas drives the sample through column 10 the individual components of the sample mixture are detained for characteristically different time periods; then eluted through detection means 22.

The detection means comprises an inlet 56 having a chamber and orifice, diverging passageways 57 and 58, and recycle passageways 59 and 60, as described in U.S. Pat. No. 3,273,377. At least one microphone is used to sense frequency of oscillations of gas flow in the passageways. Microphones 62 and 63 are positioned in the plate so as to pick up vibrations of the same frequency of opposite phase. As the individual components are eluted in sequence from column 10, the two recycle streams 59 and 60 act in opposition to one another in such a manner that oscillations of the main stream between passageways 57 and 58 are established. An increase in molecular weight of the eluted stream tends to decrease the frequency of the oscillations due to the greater inertia of the gas stream. This change in oscillation frequency is received by the microphones 62 and 63 and reflected in their output. In this particular embodiment, temperature control of the apparatus is provided by attachment of electrical strip heaters 64 and 65. Temperature control of the apparatus can also be provided by depositing conductive films on the nonconductive materials from which the apparatus is formed.

Reasonable modification and variation are within the scope of the invention which is directed to a novel chromatographic column.

I claim:

1. A chromatographic column for the separation of components of mixtures of fluids comprising:
   a first plate having a surface having formed therein a micro channel passageway having a dendriform internal surface leading in a circuitous path across said surface;

a second plate secured to said surface in fluid-tight relationship to form a single unobstructed flow passage having a feed end and a discharge end, the internal dimensions of said passage being in such relationship to the length of said passage that components of the fluid mixture moving through said passage are detained within the passage for characteristically different periods of time to emerge separately from the discharge end of said passage; and sample injection means, carrier fluid injection means and sample detection means, said sample injection means comprising a fluidic switching valve formed as an extension of said passageway in said plate.

2. The apparatus of claim 1 wherein said sample fluid injection means comprises a first fluidic switching valve, said carrier fluid injection means comprises a second fluidic injection valve, and said detection means comprises a fluid oscillator, said fluidic switching valves and said fluid oscillator being formed as extensions of said passageway in said first plate.

3. A chromatographic column for the separation of components of mixtures of fluids comprising:

a first plate having a surface having formed therein a microchannel passageway having a dendriform internal surface leading in a circuitous path across said surface;

a second plate secured to said surface in fluid-tight relationship to form a single unobstructed flow passage having a feed end and a discharge end, the internal dimensions of said passage being in such relationship to the length of said passage that components of the fluid mixture moving through said passage are detained within the passage for characteristically different periods of time to emerge separately from the discharge end of said passage; and sample injection means, carrier fluid injection means and sample detection means, said carrier fluid injection means comprising a fluidic switching valve formed as an extension of said passageway in said plate.

4. A chromatographic column for the separation of components of mixtures of fluids comprising:

a first plate having a surface having formed therein a microchannel passageway having a dendriform internal surface leading in a circuitous path across said surface;

a second plate secured to said surface in fluid-tight relationship to form a single unobstructed flow passage having a feed end and a discharge end, the internal dimensions of said passage being in such relationship to the length of said passage that components of the fluid mixture moving through said passage are detained within the passage for characteristically different periods of time to emerge separately from the discharge end of said passage; and sample injection means, carrier fluid injection means and sample detection means, said detection means comprising a fluid oscillator formed as an extension of said passageway in said plate and at least one microphone positioned to sense changes in frequency emitted by said oscillator.

References Cited
UNITED STATES PATENTS

| | | | |
|---|---|---|---|
| 2,920,478 | 1/1960 | Golay | 73—23.1 |
| 3,143,404 | 8/1964 | Heigl | 55—208 |
| 3,149,941 | 9/1964 | Barnitz et al. | 55—386 |
| 3,254,479 | 6/1966 | Goeschl | 55—386 |
| 3,263,493 | 8/1966 | Davidson | 73—53 |
| 3,273,377 | 9/1966 | Testerman et al. | 73—23.1 |
| 3,307,333 | 3/1967 | Norem et al. | 55—86 |

FOREIGN PATENTS

| | | |
|---|---|---|
| 1,113,319 | 7/1961 | Germany. |

RICHARD C. QUEISSER, Primary Examiner

E. J. KOCH, Assistant Examiner